US006081528A

United States Patent [19]
Thomann

[11] Patent Number: 6,081,528
[45] Date of Patent: Jun. 27, 2000

[54] SHARED BUFFER MEMORY ARCHITECTURE FOR ASYNCHRONOUS TRANSFER MODE SWITCHING AND MULTIPLEXING TECHNOLOGY

[75] Inventor: Mark R. Thomann, Boise, Id.

[73] Assignee: Micron Technology, Inc., Boise, Id.

[21] Appl. No.: 08/806,827

[22] Filed: Feb. 26, 1997

Related U.S. Application Data

[63] Continuation-in-part of application No. 07/456,520, Jun. 1, 1995, Pat. No. 5,719,890.

[51] Int. Cl.[7] .................................................. G11C 29/00
[52] U.S. Cl. ......................... 370/395; 370/412; 370/423; 370/429; 365/230.05
[58] Field of Search ................................... 370/229, 230, 370/231, 235, 412, 395, 398, 413, 414, 419, 422, 423, 428, 429; 377/26; 365/230.05; 371/40.11, 40.14

[56] References Cited

U.S. PATENT DOCUMENTS

| | | | |
|---|---|---|---|
| 4,070,710 | 1/1978 | Sukonick et al. | 364/900 |
| 4,120,048 | 10/1978 | Fuhrman | 365/239 |
| 4,183,058 | 1/1980 | Taylor | 358/127 |
| 4,513,392 | 4/1985 | Shenk | 364/900 |
| 4,592,022 | 5/1986 | Shimohigashi et al. | 365/189 |
| 4,648,077 | 3/1987 | Pinkham et al. | 365/240 |
| 4,675,842 | 6/1987 | Szenes et al. | 364/900 |
| 4,692,900 | 9/1987 | Ooami et al. | 365/63 |
| 4,747,081 | 5/1988 | Heilveil et al. | 365/219 |
| 4,775,959 | 10/1988 | Sato et al. | 365/189 |
| 4,825,418 | 4/1989 | Itoh et al. | 365/207 |
| 4,891,749 | 1/1990 | Hoffman et al. | 364/200 |
| 4,891,794 | 1/1990 | Hush et al. | 365/189.04 |
| 5,001,671 | 3/1991 | Koo et al. | 365/230.05 |
| 5,007,028 | 4/1991 | Ohshima et al. | 365/233 |
| 5,058,051 | 10/1991 | Brooks | 364/900 |
| 5,093,787 | 3/1992 | Simmons | 364/406 |
| 5,187,785 | 2/1993 | Shah | 395/575 |
| 5,197,035 | 3/1993 | Ito | 365/230 |
| 5,204,841 | 4/1993 | Chappell et al. | 365/230 |
| 5,212,686 | 5/1993 | Joy et al. | 370/60 |
| 5,321,652 | 6/1994 | Ito | 365/189 |
| 5,335,199 | 8/1994 | Aoyama | 365/230 |
| 5,404,337 | 4/1995 | Sato | 365/230 |
| 5,406,527 | 4/1995 | Honma | 365/230 |
| 5,422,894 | 6/1995 | Abe et al. | 371/37.4 |
| 5,452,259 | 9/1995 | McLaury | 365/221 |
| 5,488,584 | 1/1996 | Vo et al. | 365/203 |
| 5,506,814 | 4/1996 | Hush et al. | 365/230.03 |
| 5,524,098 | 6/1996 | Holland et al | 365/219 |
| 5,535,159 | 7/1996 | Nii | 365/189 |
| 5,579,278 | 11/1996 | McLaury | 365/230.05 |
| 5,617,367 | 4/1997 | Holland et al. | 365/219 |
| 5,657,289 | 8/1997 | Hush et al. | 365/230.05 |
| 5,666,390 | 9/1997 | Morzano | 377/52 |
| 5,680,425 | 10/1997 | Morzano | 377/26 |
| 5,680,595 | 10/1997 | Thomann et al. | 395/559 |
| 5,717,647 | 2/1998 | Hush et al. | 365/230.05 |
| 5,719,890 | 2/1998 | Thomann et al. | 371/51.1 |
| 5,732,041 | 3/1998 | Joffe | 365/230.05 |
| 5,748,635 | 5/1998 | Thomann et al. | 370/465 |
| 5,778,007 | 7/1998 | Thomann et al. | 371/40.11 |
| 5,802,131 | 9/1998 | Morzano | 377/26 |
| 5,815,447 | 9/1998 | Thomann | 365/200 |

FOREIGN PATENT DOCUMENTS

| | | |
|---|---|---|
| 1-200455 | of 0000 | Japan . |
| 2-223253 | of 0000 | Japan . |
| 56-145300 | of 0000 | Japan . |

*Primary Examiner*—Ricky Ngo
*Attorney, Agent, or Firm*—Schwegman, Lundberg Woessner & Kluth P.A.

[57] ABSTRACT

An ATM switch including a multi-port memory is described. The multi-port memory having a dynamic random access memory (DRAM) and a plurality of input and output serial access memories (SAMs). Efficient, flexible transfer circuits and methods are described for transferring ATM data between the SAMs and the DRAM. The transfer circuits and methods include helper flip/flops to latch ATM data for editing prior to storage in the DRAM. Editing of ATM data transferred from the DRAM is also described. Dynamic parity generation and checking is described to detect errors induced during switching.

11 Claims, 15 Drawing Sheets

SHARED BUFFER MEMORY ARCHITECTURE FOR ASYNCHRONOUS TRANSFER MODE SWITCHING AND MULTIPLEXING TECHNOLOGY

This is a continuation-in-part of application Ser. No. 07/456,520, filed Jun. 1, 1995, now U.S. Pat. No. 5,719,890 issued Feb. 17, 1998.

TECHNICAL FIELD OF THE INVENTION

The present invention relates generally to memory devices and in particular the present invention relates to ATM switches.

BACKGROUND OF THE INVENTION

The general increase in network traffic requires fast, efficient methods of managing traffic and congestion. One problem area in network traffic management occurs at line switching where a switch is used to route data from one set of communication lines to another set of communication lines. Network switches typically comprise a memory-type device which is used to temporarily store a transmission during the switching operation.

Different queuing structures have been employed in network switches with varying results. It has been shown that switches which use input queue structures tend to create line blocking. Conversely, switches which use output queue architectures eliminate the line blocking problem. Further, switches used in asynchronous transfer mode (ATM) networks require more storage space than switches used in a more uniform transmission network. That is, ATM traffic tends to have bursts of data and be non-uniform, thereby requiring an increased amount of available memory at any given time to maintain an acceptable switching time for the ATM traffic. Poor switch time performance can result in the loss of ATM data during switching operations.

The increased demand for more memory and the need for faster switching times has resulted in the need for a fast, efficient ATM switch. Further, the variety of different ATM data cell structures requires that the switch be flexible. One specific problem in ATM switching is the need to change the routing of an ATM cell to avoid highly congested traffic paths. This typically requires that a header included in the ATM cell be amended to denote a new route, or destination address. Additional information included in an ATM cell, such as error check data, may also need to be updated. Further, because memories are susceptible to the inducement of errors, an ATM switch should include an error check scheme to monitor the occurrence of any errors induced during switching.

For the reasons stated above, and for other reasons stated below which will become apparent to those skilled in the art upon reading and understanding the present specification, there is a need in the art for a fast, flexible ATM switch which efficiently updates the routing or destination address of an ATM cell.

SUMMARY OF THE INVENTION

The above mentioned problems with ATM switches and other problems are addressed by the present invention and which will be understood by reading and studying the following specification. A

DETAILED DESCRIPTION OF THE INVENTION

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

Figure 1:
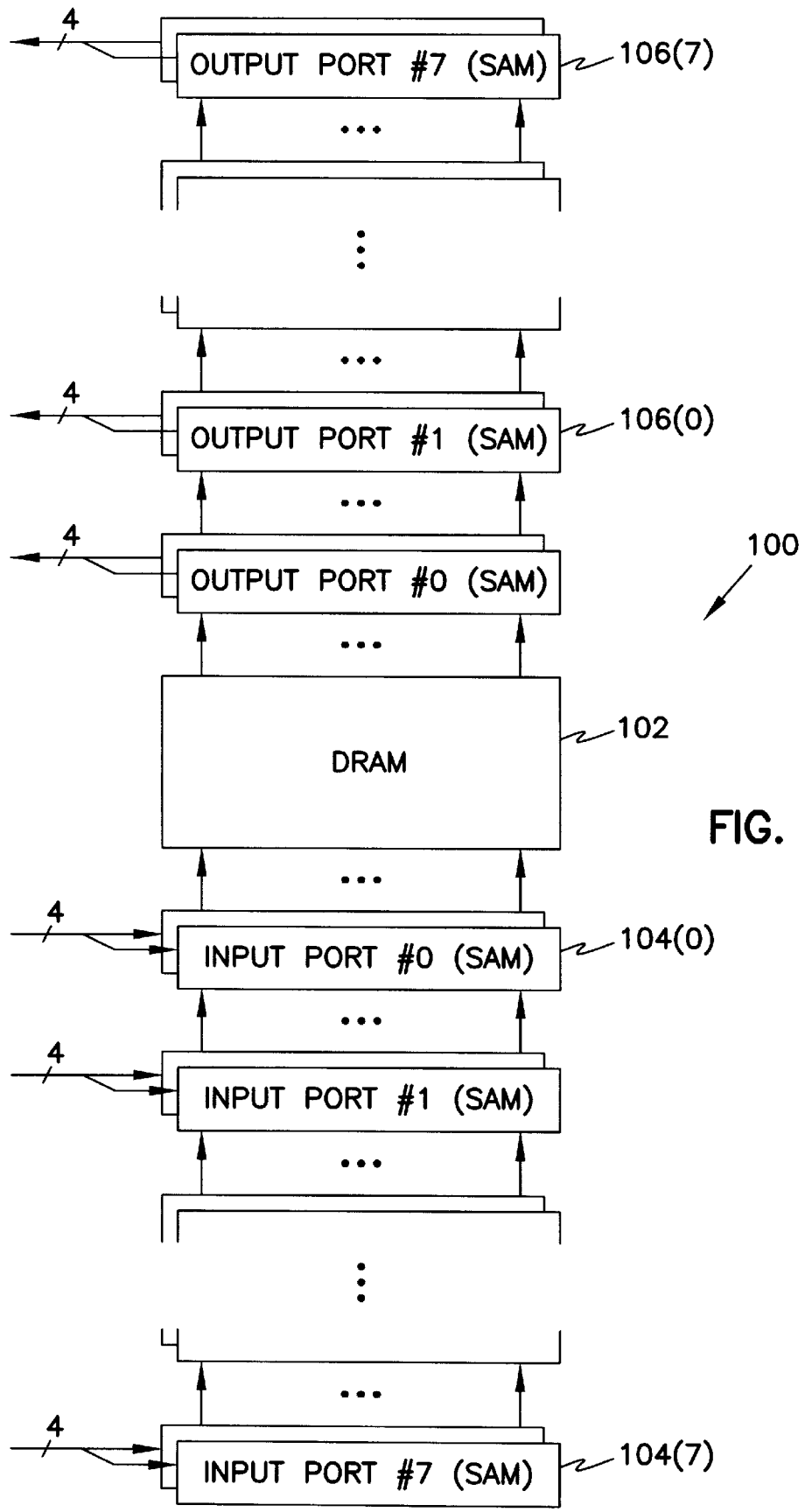
FIG. 1 is a simplified block diagram of a multi-port memory.

The present invention is described as being incorporated in a multi-port memory. The simplified block diagram of the multi-port memory 100 shown in FIG. 1 can be used to solve data path requirements for asynchronous transfer mode (ATM) networks. The memory has a dynamic random access memory (DRAM) 102 and eight double-buffered input serial access memories (SAMs) 104(0)–(7). The eight output SAMs 106(0)–(7) are also double-buffered. The input SAM's can accept back-to-back ATM cells such that one full ATM cell can be moved into the DRAM from an input port while a second ATM cell is being loaded into the input port. Likewise, the output SAM's can output one ATM cell on a four bit data bus while a second ATM cell is being transferred from the DRAM.

ATM cells flow through input ports into the input SAM's where editing can be performed. The ATM cells are transferred to the DRAM and then transferred to the output SAM's where further editing can be performed. The ATM cells are output on communication lines via output ports.

Figure 2:
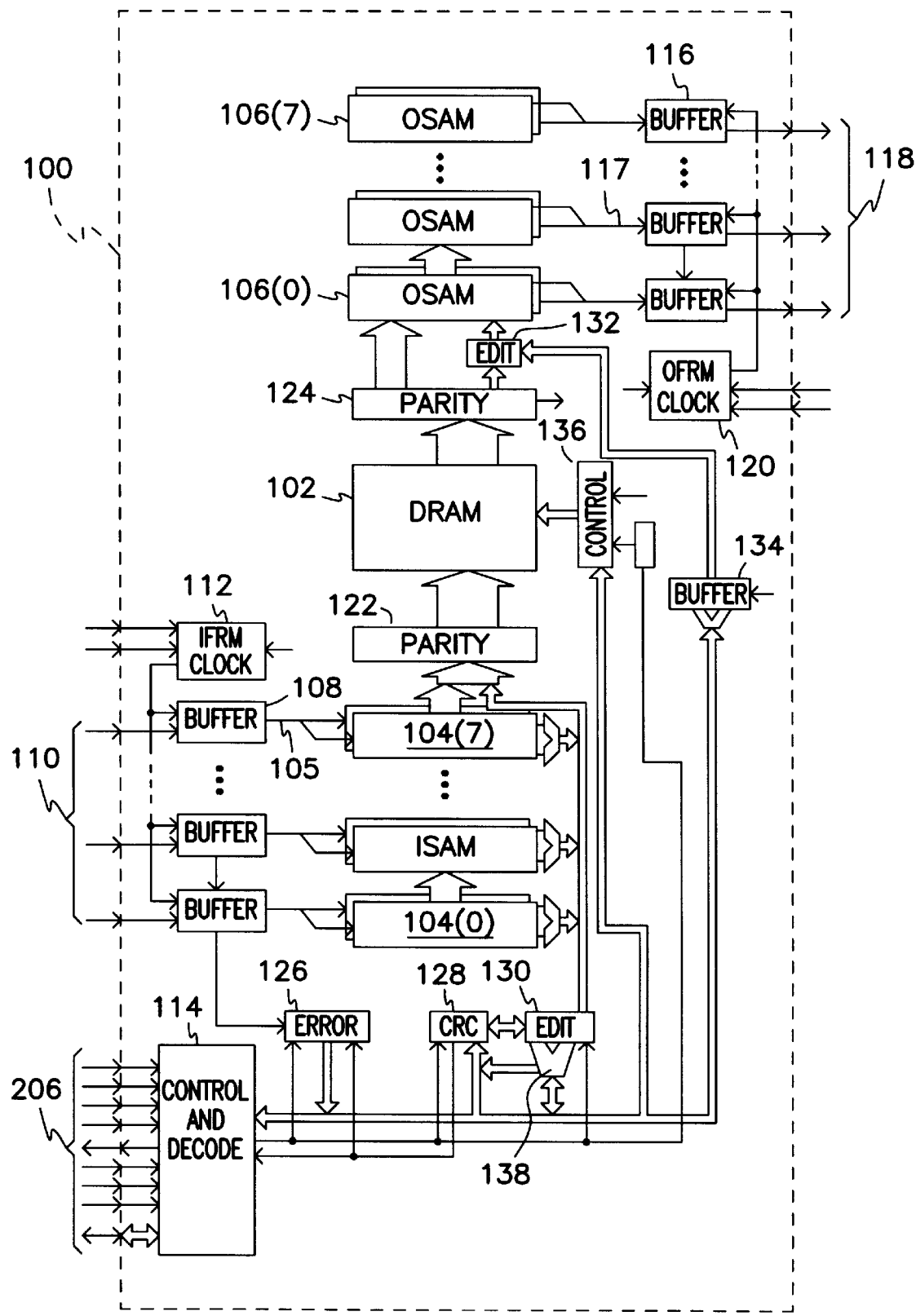
FIG. 2 is a detailed block diagram of the multi-port memory of FIG. 1.

A more detailed diagram of the multi-port memory 100 is shown in FIG. 2. The memory has a DRAM 102, input SAMs 104(0)–(7) and output SAMs 106(0)–(7) as described above. Each input port has a corresponding buffer circuit 108. The buffer circuits 108 are used to perform several finctions including latch and buffer input data, queue nibble counter, and pointer decoder and control. Four-bit input data communication bus lines 110 provide ATM cell input to the buffer circuits 108. An input frame and clock circuit 112 connected to the buffer circuits both denotes the beginning of an input cell and synchronizes the input data.

Each output SAM 106 has a corresponding buffer circuit 116. The buffer circuit 116 is used to perform several functions including latch and buffer output data, queue nibble counter, and pointer decoder and control. Four-bit output communication bus lines 118 provide ATM cell output from buffer circuits 116. An output frame and clock circuit 120 connected to the output buffer circuits denote the beginning of an output cell and synchronizes the output data.

Byte parity generator 122 provides a parity code for each ATM cell transferred to the DRAM from an input SAM 104, and byte parity check 124 checks the parity of an ATM cell transferred from the DRAM to an output SAM 106. The byte parity generator 122 and byte parity check 124 are described below.

Control interface and command decode 114 interfaces the multi-port memory 100 with an external controller, microprocessor 207, and decodes commands provided on interface lines 206 therefrom. Error/status circuit 126 monitors the status of the input SAM's 104 to determine if a transfer to the DRAM is needed and tracks the output from the byte parity check 124 to determine if an error occurred in an ATM transfer. Cyclical redundancy check (CRC) logic 128 and edit buffer control 130 together provide a means of modifying the ATM cell prior to transferring it from an input SAM port 104 to the DRAM, as described below. An output editor 132 and output edit buffer 134 allow for the modification of the ATM cell prior to outputting through the output SAMs 106. Memory control circuit 136 provides the circuitry needed to address the DRAM as known by one skilled in the art.

ATM DATA FLOW

Referring to FIG. 2, in general, ATM cells flow through the buffer circuits 108 into the input serial access memory (ISAM) 104 where editing can be done by an external control function provided through the control interface. The external control function instructs the chip when to store ISAM cells in the DRAM 102 and when to load the output serial access memory ports (OSAM) 106 from the memory 102. The OSAMs deliver the ATM cells to output buffers 116 for dispatch. The following paragraphs describe the data flow in more detail.

ATM cells enter the chip through communication line inputs 110 to the input buffers 108. The 4-bit parallel stream is loaded into an ISAM 104 by the clock associated with the buffers over 4-bit data bus 105. The input frame and clock circuit 112, marking the first data nibble of the ATM cell, is used to start the ISAM load. Once a complete cell has been loaded into an ISAM, the sam error/status circuit 126 sets a "ISAM full" status bit. As noted above, the ISAMs are two ATM cells long, so the next ATM cell can continue to stream into the ISAM. An asynchronous, external control function polls the ISAM status through the control interface and command decode 114. Once a ISAM full status is detected by the external controller through the control interface and command decode 114, the first 72 bits of the ISAM are copied to the input edit buffer 130 and the first or second word of the ISAM can be output to the external controller using mux 138. The external controller evaluates and optionally modifies the word and then initiates a write to the DRAM moving the content of the input edit buffer (bits 0–71) and the remaining content of the ISAM (bits 72–447) over a write transfer bus to the DRAM row specified by an address presented through the memory logic control 136. The ISAM full status is cleared when the ISAM is transferred. The first and/or second word of the input edit buffer 130 can be returned by the external controller to modify the content of the ISAM. Further discussion of the input edit buffer operation is presented below. The entire contents of an ISAM can also be directly transferred to the DRAM without copying or evaluating the first 72 bits. In this operation the entire cell is transferred intact.

The external controller polls an output port status through the control interface and command decode 114 for empty OSAMs. Once an empty OSAM 106 is detected, a DRAM read is initiated to move data at a DRAM row specified by an address from the memory control 136 over a read transfer bus to the OSAM. The first or second word of the ATM cell can be edited by output edit register 132. Further discussion of the output edit register operation is presented below. Like a write transfer, the transfer to an OSAM clears the empty OSAM status. OSAMs are double buffered, and similar to the ISAMs can continuously stream data out of the output buffers 116. The 4-bit parallel stream is clocked over 4-bit data bus 117 by the clock associated with the output buffers 116 by output frame and clock circuit 120.

CELL EDIT OPERATIONS

The multi-port memory stores ATM cells of 56 bytes in the internal DRAM 102. The standard ATM cell consists of 4 bytes of header, 48 bytes of data, and one byte of header-error-check. The header-error-check is typically a cyclical redundancy check (CRC) code, which is used on communication links and may or may not be presented to the multi-port memory. The remaining space, either 3 or 4 bytes depending on the presence of the CRC, can be used to store specialized routing information for space-division switches, specialized error control information, or any other purpose. These additional bytes are referred to herein as "prepend/postpend" data, and the number of bytes of each is configurable. The prepend/postpend data can be generated, read, written, and stripped through cell editing operations and configuration parameters as detailed below.

The input edit buffer 130, in concert with the CRC circuitry 128, provides a means to modify the ATM cell captured in an ISAM 104 before storing in the DRAM 102. These modifications can be either of the cell header, or of the prepend/postpend data attached to the cell. Updating of the cell header can also include an update of the CRC byte.

The output edit register 132 provides the means to modify the ATM cell contents at the last possible moment prior to outputting the cell. The output edit register provides data to an OR-type logic function, allowing the control interface and command decode 114 to set selected bits in the cell header or prepend/postpend data. If the cell header is updated, the corresponding CRC can also be updated using the output edit register.

All ATM cell editing is performed using the external controller. The external controller can get either the prepend/postpend or header word from an ISAM through edit buffer 130 and mux 138. The first 9 bytes (72 bits) of the selected ISAM are copied into the input edit buffer 130, and either the first or second word out is passed through mux 138 to the command interface and command decode 114, and ultimately to the external controller. A check of the CRC byte can also be performed using CRC logic 128.

After the external controller has examined the header and/or the pre/postpend data, it may update them via a transfer command or a transfer with CRC command. For example, the transfer with CRC command tells the memory to updated the CRC byte. After updating, the controller issues a store ISAM command to copy the ISAM data into the DRAM with any modifications that may have been made in the edit buffer 130 and CRC logic 128.

The output edit register 132 contains 64 data bits that are NOR'ed with the header and prepend/postpend data bytes from the DRAM on its way to an OSAM. This provides a way for the external controller to modify an ATM cell just prior to transmission, to include e.g. up-to-date congestion information, or up-to-date prepended routing information for a next stage switch. The output edit register 132 is controlled by the external controller. Corrections to the CRC byte can also be performed based on an updated header. The CRC byte is updated by an XOR logic operation.

Figure 3:
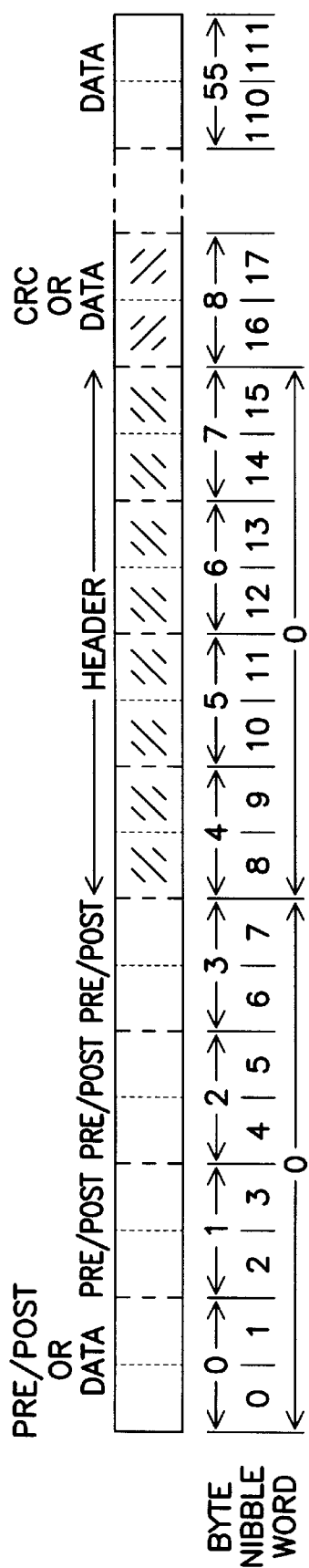
FIG. 3 is a 56 byte ATM cell having a specific byte assignment.
Figure 4:
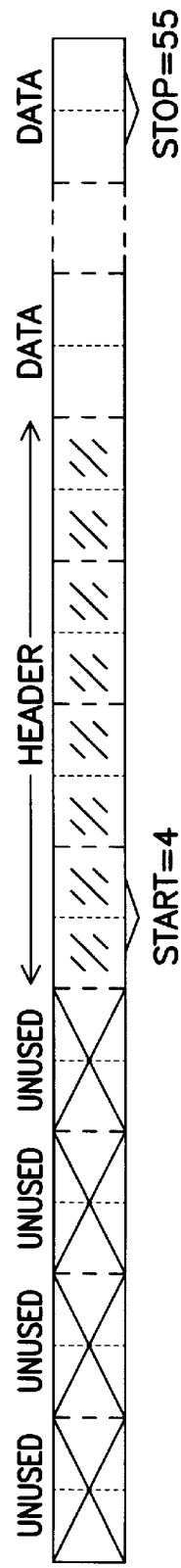
FIG. 4 is a 52 byte ATM cell having a specific byte assignment.
Figure 5:
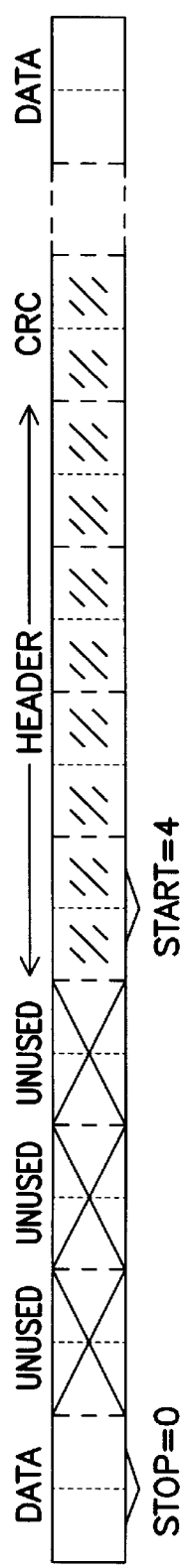
FIG. 5 is a 53 byte ATM cell having a specific byte assignment.

Editing support for various cell lengths is accomplished by defining the ISAM start and stop positions within the ISAM's 56 byte space. The start and stop pointers are loaded by the command interface and command control 114, and are set such that the cell header appears in bytes 4–7 of the ISAM. The CRC byte, if present, is always in byte 8 of the ISAM. FIG. 3 shows the ISAM space with the ATM cell header properly aligned. For the cases without any pre/postpend data, FIG. 4 show the ISAM start pointer set to 4 and the ISAM stop pointer set to 55 if no CRC is present (making a 52 byte cell). Similarly, FIG. 5 shows the start pointer set to 0 if CRC is present (making a 53 byte cell).

There are different configurations for the ISAMs, each giving various amounts of prepended and postpended data. The values of start and stop positions for different configurations are given in Table 1. It will be understood that values other than these may also be used in a carefully designed non-ATM system.

TABLE 1

|  | W/O CRC | | With CRC | |
| --- | --- | --- | --- | --- |
|  | Start | Stop | Start | Stop |
| Without pre/postpend data | 4 | 55 | 4 | 0 |
| 1 byte prepend | 3 | 55 | 3 | 0 |
| 1 byte postpend | 4 | 0 | 4 | 1 |
| 2 bytes prepend | 2 | 55 | 2 | 0 |
| 1 byte prepend & 1 byte postpend | 3 | 0 | 3 | 1 |
| 2 bytes postpend | 4 | 1 | 4 | 2 |
| 3 bytes prepend | 1 | 55 | 1 | 0 |
| 2 bytes prepend & 1 byte postpend | 2 | 0 | 2 | 1 |

TABLE 1-continued

|  | W/O CRC | | With CRC | |
| --- | --- | --- | --- | --- |
|  | Start | Stop | Start | Stop |
| 1 byte prepend & 2 bytes postpend | 3 | 1 | 3 | 2 |
| 3 bytes postpend | 4 | 2 | 4 | 3 |
| 4 bytes postpend | 0 | 55 | | |
| 3 bytes prepend & 1 byte postpend | 1 | 0 | | |
| 2 bytes prepend & 2 bytes postpend | 2 | 1 | | |
| 1 byte prepend & 3 bytes postpend | 3 | 2 | | |
| 4 bytes postpend | 4 | 3 | | |

The OSAM start and stop address are separately configurable from the ISAM ones. Thus, outgoing cells can have more bytes or fewer bytes than incoming cells. This feature provides the capability for adding or deleting prepended and postpended data bytes. The table of start and stop addresses is identical to that for the ISAMs given above in Table 1.

TRANSFER OPERATIONS

Figure 6:
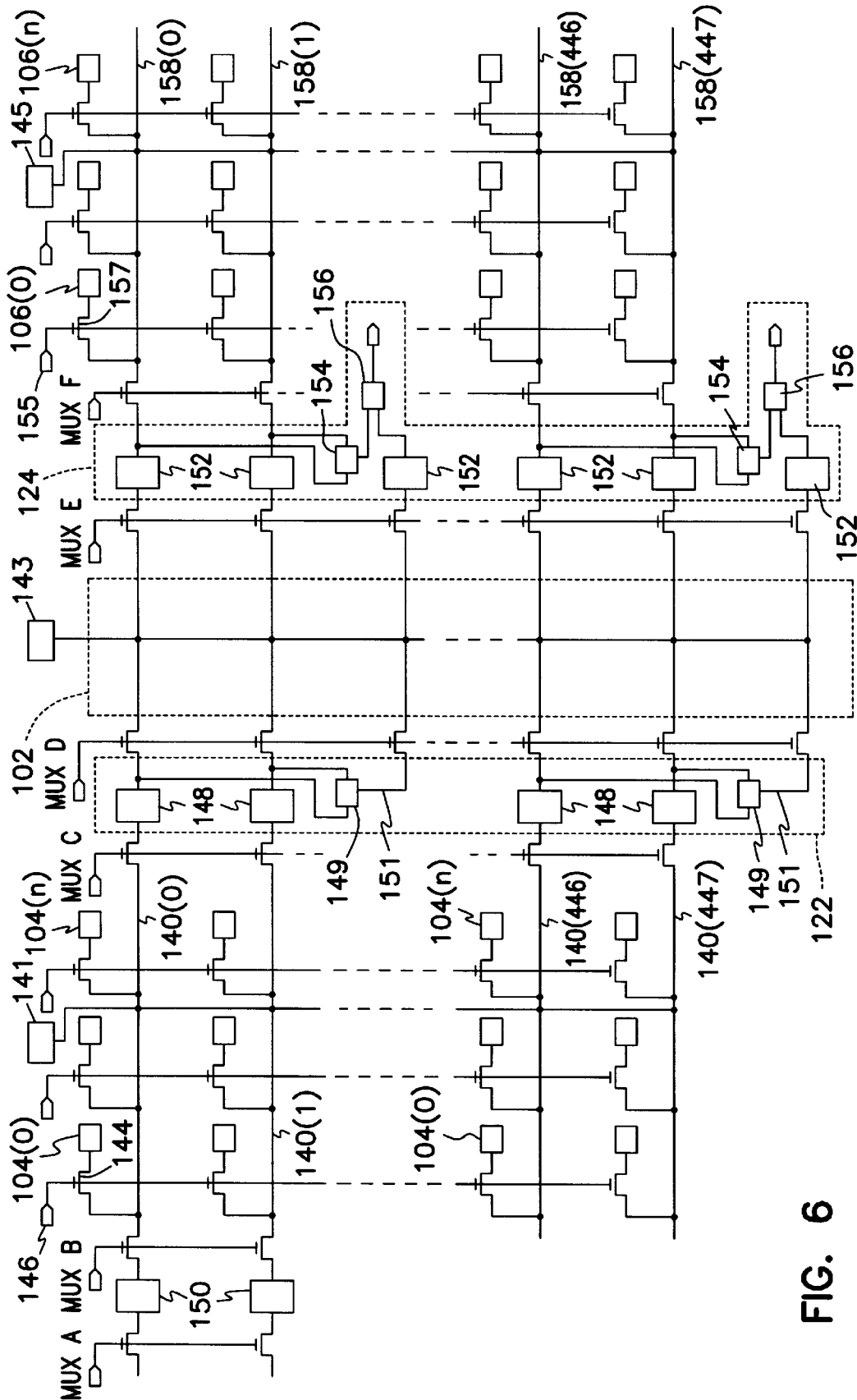
FIG. 6 is a block diagram of the transfer circuit of the multi-port memory of FIG. 2.

As described above, there are 376 data bus lines and 72 other bus lines (56 bytes) connecting the ISAMs to the byte parity generator 122 through a write transfer bus. After the parity bytes are generated by byte parity generator 122, there are 504 bus lines (63 bytes) connected to the DRAM. Similarly, 504 bus lines connect the DRAM to the byte parity check 124 and a total of 448 lines are connected to the OSAMs through a read transfer bus. Four of these bus lines are rate illustrated in FIG. 6, two data buses and two header bus lines. Transfer buses 140(0) and (1) are the first two buses used to connect the first two bits of the prepend/postpend byte of the ATM cell from ISAMs 104 to DRAM 102. Transfer buses 140 (446) and (447) are the last two bits of the 56 bytes of the ATM cell. FIG. 6, shows the "true" transfer bus line. It is noted that for each transfer bus there is an accompanying complement transfer bus line which is not illustrated.

In the most simple example, the contents of an ISAM 104 are write transferred to the DRAM 102 and then read transferred to an OSAM 106. Accurately and efficiently transferring an ATM cell, however, often requires manipulation of portions of the cell as described above. Transfer buses 140(0) and (1) can be connected through transistors to the first two bits of each ISAM, noted as 104 (0)–104 (N) (where n is equal to 7 in this embodiment). Control lines 146 can be selectively activated to turn transistors 144 on, thereby connecting one of the ISAMs to one of the transfer buses. Multiplex (mux) lines A through F are used to isolate sections of the transfer buses during certain transfer operations. For example, to get the ISAM header from ISAM 104(0), the write transfer buses 140 are pre-charged with pre-charge circuit 141, control line 146 is selectively activated and mux line C (initially activated) is deactivated to isolate the write transfer buses from helper flip/flops 148 (HFF). HFFs are known to one skilled in the art, and illustrated in FIG. 7. Mux line A remains turned off to isolate HFFs 150 from the edit buffer control 130 connected thereto. Mux line B, however, is activated so that the contents of the ISAM cell 104 (0) can be captured by HFFs 150. Control line 146 is deactivated to isolate ISAM cell 104 (0) from write transfer buses 140. Mux line B is then deactivated and mux line A is activated so that the edit buffer control 130 and CRC logic 128 can access and modify the header, prepend/postpend, and CRC bytes latched in HFFs 150.

As explained above, the 32-bit header and the 32-bit prepend/postpend data can be modified using the edit buffer control 130. This is accomplished by selectively changing the state of HFFs 150. A new CRC code can also be generated for the modified header using CRC generator 128 such that the HFFs 150 associated with the 8-bit CRC code are selectively changed using edit buffer control 130. Using HFFs 150 provides a fast, low power way of accessing and modifying the state of the ISAM bits. After HFFs 150 have been selectively changed, mux line A is deactivated and mux lines B and C are activated. The contents of HFFs 150 are transferred to HFFs 148. HFFs 148 are isolated from the write transfer bus 140 and the DRAM 102 by deactivating mux lines C and B.

Parity generator 122 has generator circuits 149 which generate a parity bit for every 8 write transfer bus lines. That is, the contents of one byte of HFFs 148 produce one bit of parity data 151. The 448 bits of data transferred from the ISAMs 148 is appended, therefore, with 56 parity bits, for a total of 504 bits transferred to DRAM 102.

The 376 data bus lines connected to the ISAMs are used to transfer data to the DRAM through write transfer bus 140 and HFFs 148. The ATM data is not modified and is therefore directly transferred to HFFs 148 where corresponding parity bits are generated. After all parity bits 151 have been generated, mux line D is activated and the contents of all 504 HFFs are transferred to a DRAM row address accessed with memory control 136.

Mux line E is activated to perform a read transfer of an ATM cell stored in the DRAM 102 to the OSAMs 106. The contents of the DRAM row accessed is transferred to HFFs 152 and mux line E is then deactivated. Byte parity check 124 has a parity generator 154 which produces a parity bit for each byte of the 56 bytes of the ATM cell. The parity bits are compared to the parity bits 151 stored in the DRAM during the write transfer operation using comparator circuit 156. Any parity errors are thereby identified using Comparator 156 and error status circuit 126.

Mux line F is activated to connect the read transfer buses 158 to the HFFs 152 and the intended OSAM is selectively accessed using control lines 155 and corresponding transistors 157. Output edit register 132 (not shown in FIG. 6) is used to modify the contents of the 72 bits comprised of the header, prepend/post-pend and CRC bits. The header and prepend/postpend bytes are modified by using an NOR gate so that each bit output from the HFFs 152 are NORed with an output from the edit buffer output 134. Similarly, the CRC bits are individually XORed with an output from the edit buffer output 134. A post-DRAM edit is typically performed so that an ATM cell can be broadcast to a plurality of locations instead of one location. It will also be understood that a post-DRAM edit can be used to change the address of the intended individual receiver which was designated prior to storing in the DRAM.

It will be understood that a pre-charge circuit 141, 143, or 145 is included with select segments of transfer bus 158 which can be isolated using a Mux line. This allows each segment to be pre-charged prior to connecting to another segment, as described below. It will be further understood that Mux F and the pre-charge circuit 145 associated therewith can be replaced with an inverter and a pre-charge circuit at its input. The input of the inverter would therefore remain high unless a low signal was present at HFF 152. The output of the inverter would then toggle high from its normally low state.

SAM to HFF Transfer

Figure 7:
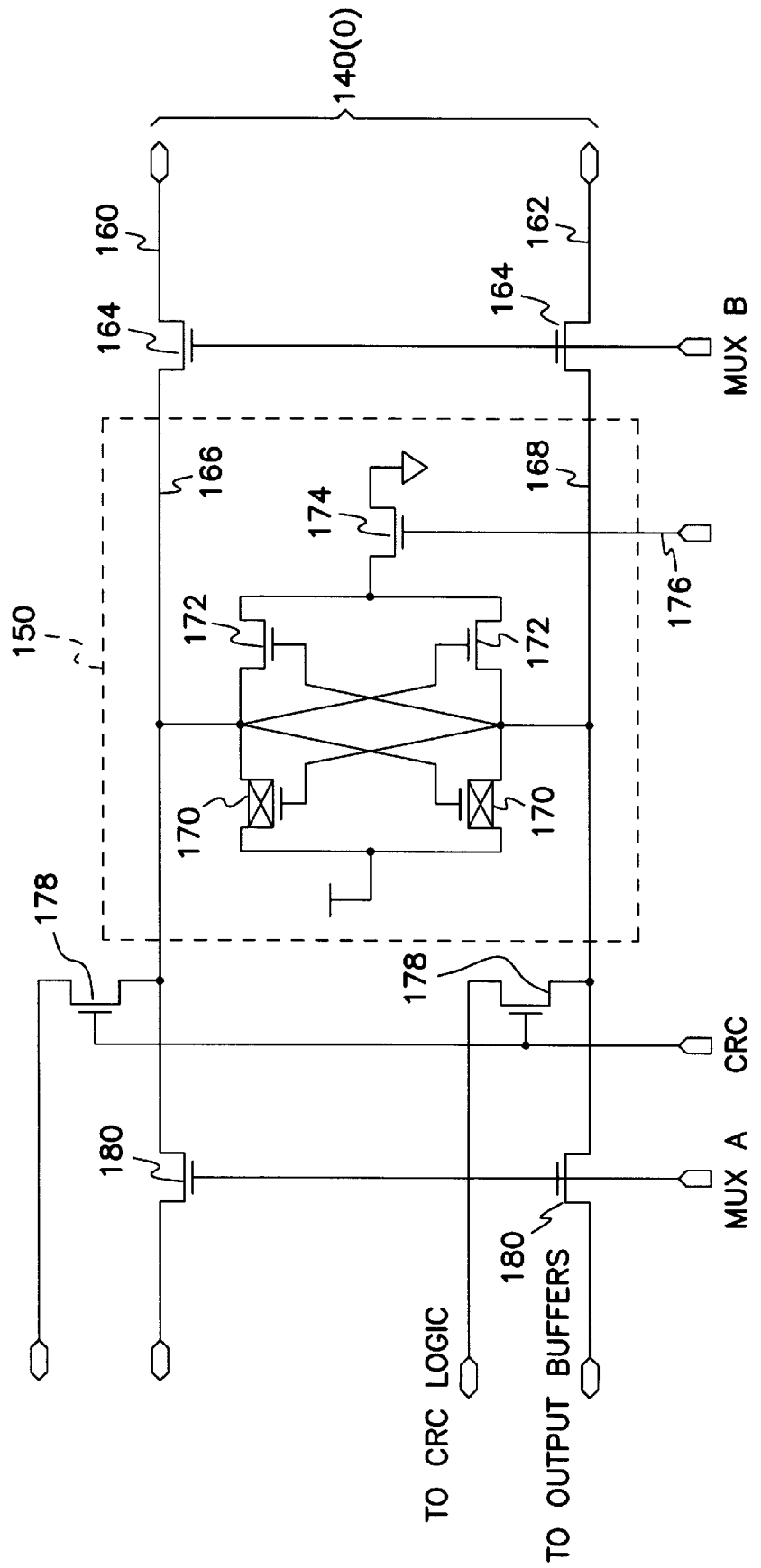
FIG. 7 is a schematic of a helper flip/flop portion of the transfer circuit of FIG. 6.

Referring to FIG. 7, a standard HFF architecture is illustrated. More specifically, FIG. 7 shows HFF 150 connected to the edit buffer control 130 which is connected to write transfer bus 140(0). Both the true 160 and complement 162 lines of the write transfer bus lines 140 (0) are shown. Transistors 164 are connected to electrically isolate the write transfer bus lines 160 and 162 and the HFF true 166 and complement 168 data lines. HFF 150 is comprised of two n-type transistors 170 and two p-type transistors 172 having their gates cross-coupled to the true 166 and complement 168 data lines. The sources of transistors 170 are connected to the supply voltage and the drains of transistors 172 are connected to enable/latch transistor 174. Enable line 176 is connected to the gate of enable/latch transistor 174. Transistors 178 are used to electrically connect the HFF 150 to the CRC logic 128. Likewise, Transistors 180 are connected to mux line A and are used to connect HFF 150 to output buffer of the control interface and command decode 114. HFF 150 latches the state of the true and complement data lines when enable line 176 goes high.

Figure 8:
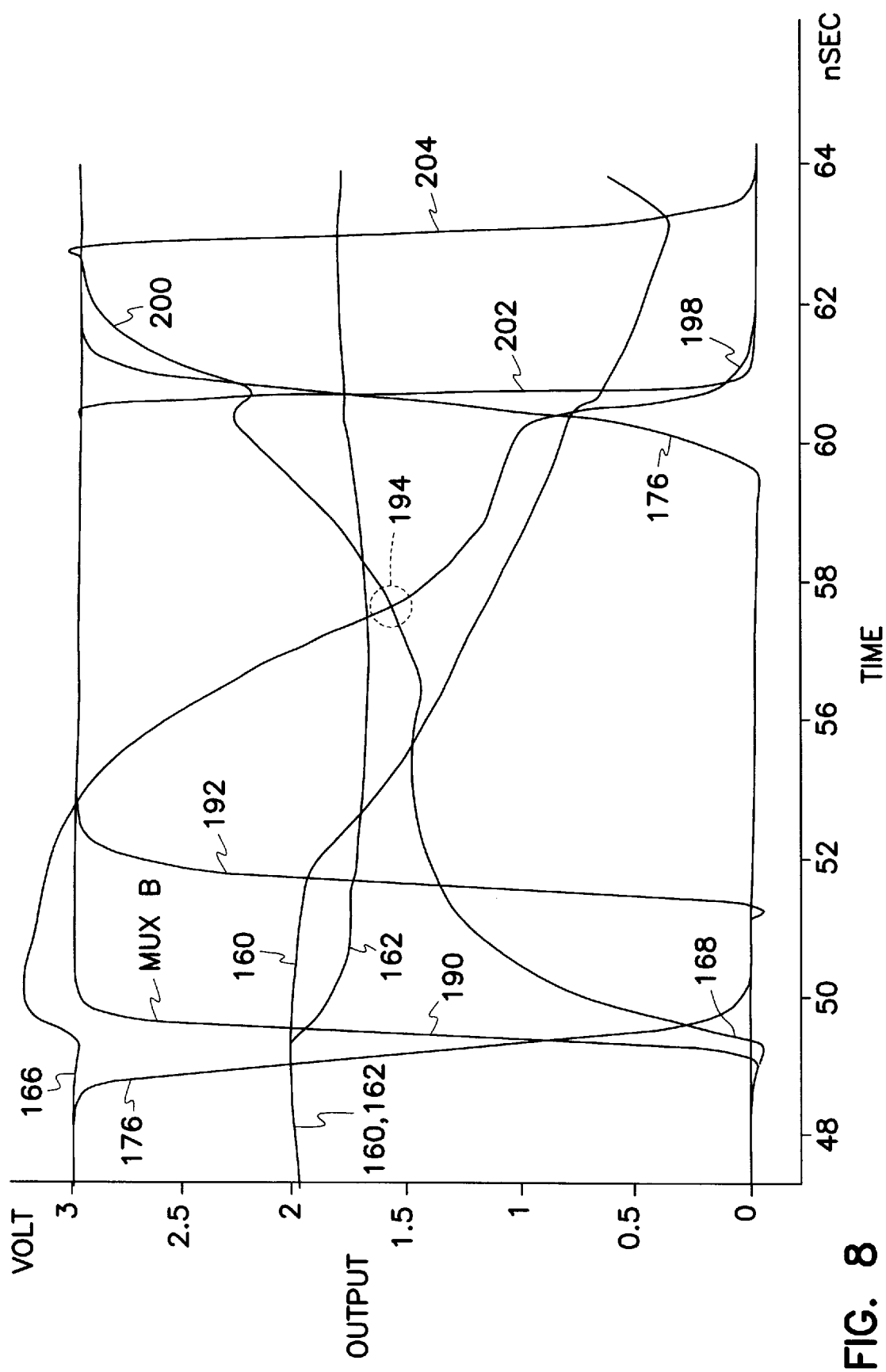
FIG. 8 is a graph of a transfer of data from an input serial access memory to an edit buffer circuit of the multi-port memory of FIG. 2.

Representative voltages and timing of an HFF 150 latch operation of data stored in an ISAM cell header are illustrated in FIG. 8. The voltages and timing are intended as illustrations and are not to be taken as limitations. Prior to transferring data from an ISAM to the HFF 150, the write transfer bus true 160 and complement 162 lines are both pre-charged to speed the data latch. The prior-state latched by the HFF in this illustration is such that the true data line 166, is high and the complement data line 168, is low. The latch enable line 176 toggles to a low state, thereby shutting transistor 174 off. The drains of transistors 172 are, therefore, floating. Mux line B goes high at 190 to electrically connect the HFF 150 to the write transfer bus lines 160 and 162. The write transfer bus is still pre-charging so that the true line 160 remains high and the complement line 162 attempts to remain high as the complement data line 168 is pulled high. The pre-charge circuit is turned off at 192 and the pass gate, or control line 146, to the SAM cell is also activated at 192 so that the ISAM is connected to the write transfer bus. In this illustration, the state of the SAM cell is such that the true line 160 of the write transfer bus is lower than the complement line 162. As a result, the HFF true data line 166 is pulled low and the HFF complement data line 168 continues to increase until the HFF data lines cross at 194. At the cross-over point 194, the HFF changes state. That is, the n-type transistor 170 connected to the HFF complement data line 168 begins to turn on, thereby continuing to pull the complement data line higher. After the data lines have crossed over, the enable line 176 is activated so that transistor 174 is turned on. Both data lines 166 and 168 are forced to the power rails at 198 and 200, respectively, and the HFF has latched the state present on the ISAM cell. Mux line B is then de-activated at 202 to electrically isolate the HFF from the write transfer bus. Finally, control line 146 is de-activated to isolate the SAM from the write transfer bus and the transfer bus pre-charge is turned on at 204.

FIG. 8 illustrates the process of latching a state of an ISAM cell which is opposite of the prior-state of the HFF. It will be understood that latching a state which is the same as the prior-state follows a similar process, except the HFF never crosses over. Further, after the HFF has latched the ISAM cell, the HFF can be accessed by the command interface and command control 114 or the CRC logic 128, using either mux line A or mux line CRC, respectively. Additional editing and transfers to the DRAM are conducted as explained above.

Figure 9:
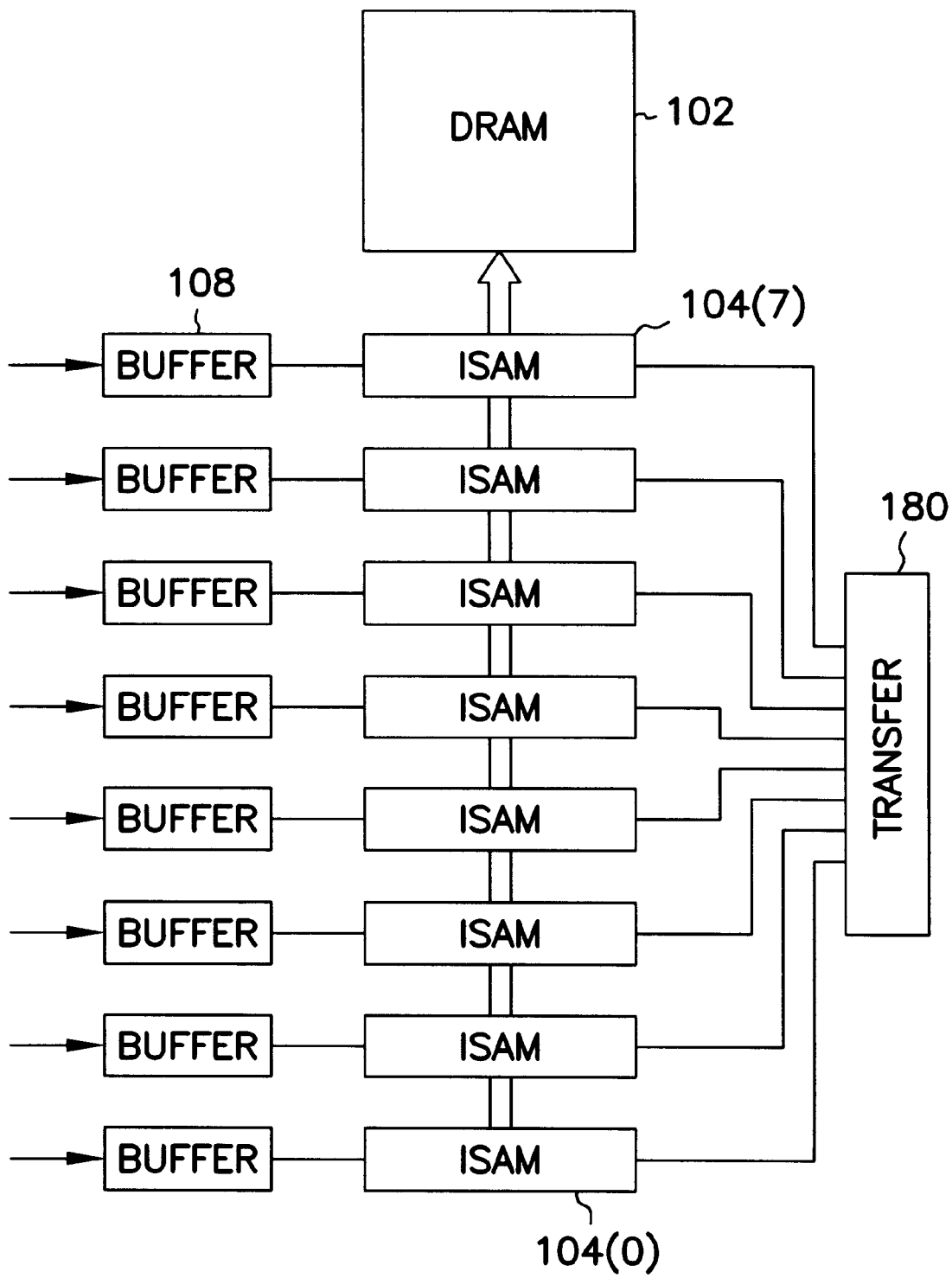
FIG. 9 is a block diagram of portions of the multiport memory of FIG. 2.

FIG. 9 illustrates a portion of the multiport memory 100 of the present invention. The memory includes dynamic random access memory (DRAM) 102 and ISAMs 104(0)–(7). Each ISAM 104 has a buffer/decode circuit 108 which provides an input buffer and a decoder circuit for "pointing" to a bit of the input. The clock circuit 112 supplies individual clock signals to the buffer circuits. The clock signals can be independent, or synchronized so that selected input buffers are clocked together. Transfer circuitry 180 is included in controller 114 to transfer data stored in the ISAMs, either independently or in combination, to the DRAM. The transfer circuit 180 controls the transfer of data from the ISAMs to the DRAM. In the simplest transfer mode one entire ISAM is transferred to one row of the DRAM. As explained below, the transfer circuit 180 can selectively transfer bits of data from several ISAMs to one row of the DRAM.

Figure 10:
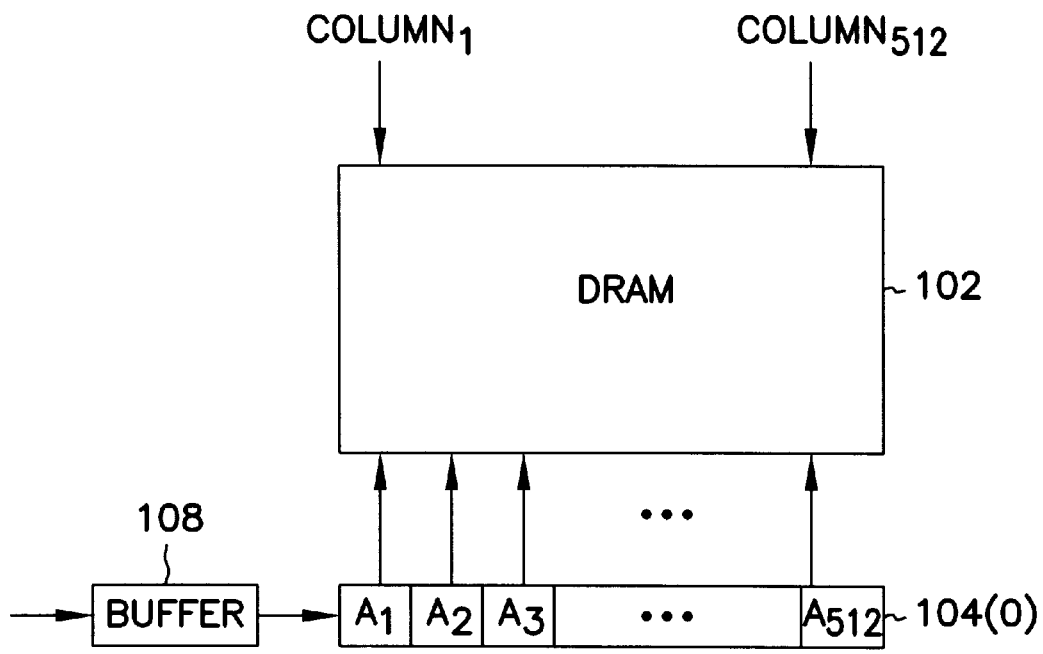
FIG. 10 is a block diagram illustrating the transfer lines between the DRAM and one of the input SAMs of the memory of FIG. 2.

Referring to FIG. 10, one of the eight ISAMs 104(0) is illustrated with the DRAM array 102. Any of the eight ISAMs can be transferred to any row of the DRAM, therefore, each of the eight SAMs are the same length as a DRAM row (512 bits). For example, ISAM A 104(0) has 512 data memory cells with bit addresses A1 to A512. In it simplest operation, one bit of data is loaded into an ISAM on each ISAM clock cycle. When all 512 bits have been loaded, the data is transferred to a row of the DRAM. From the DRAM "perspective", one ISAM "looks" like 512 bits of parallel data. The ISAMs can, therefore, store and input data package of up to 512 bits.

Figure 11:
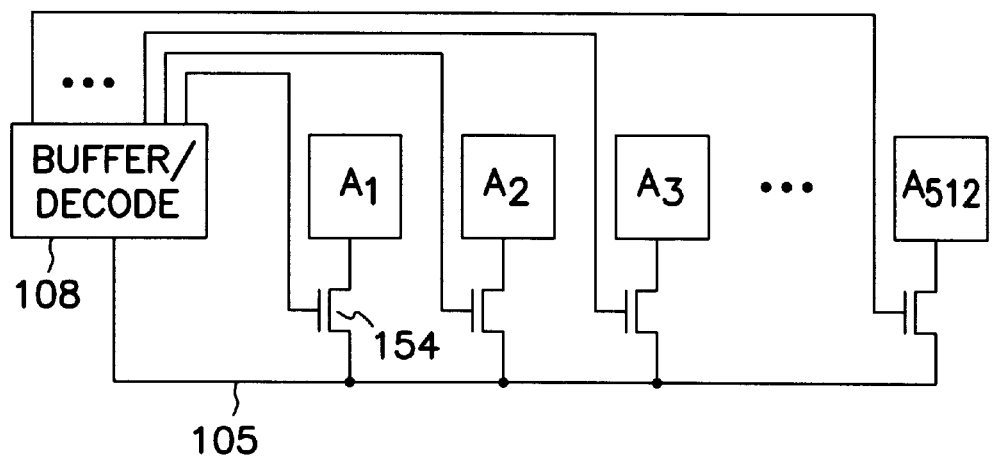
FIG. 11 is a more detailed schematic of a SAM and buffer circuit of the memory of FIG. 2.

FIG. 11 illustrates data bit addresses of ISAM A 104(0) coupled to its associated buffer circuit 108. The bit addresses of the ISAM can be selectively coupled to a data bus using access transistors 154 and the decoder of the buffer circuit 108. The decoder includes a 10 bit counter which is used to "point" to one of the 512 data bit addresses of the ISAM. To load data into an ISAM, the decode circuit 108 activates the coupling transistor 154 for an ISAM bit address based upon the state of the counter. Data contained in the buffer 108 is then stored in the ISAM bit address via the data bus 105. Control circuit 114 can be used to adjust the counter such that the ISAM is loaded starting at an address other than bit address 1. On each clock cycle the counter is incremented and a bit of data is loaded into the next ISAM address. When all 512 ISAM bits are full, the data is transferred to the DRAM and the ISAM loading operation begins again.

Figure 12:
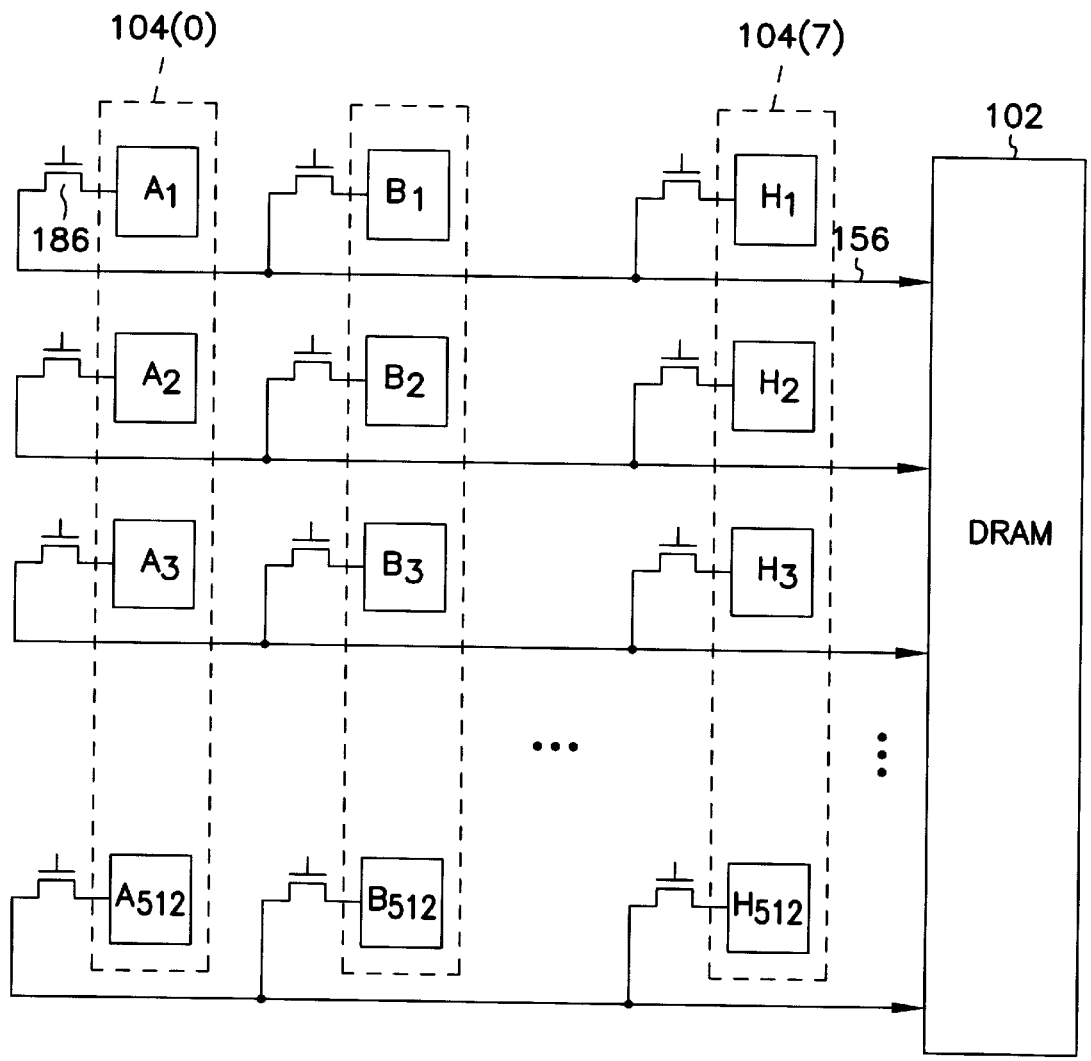
FIG. 12 is a more detailed schematic of the input SAMs and the transfer lines of the memory of FIG. 2.

FIG. 12 illustrates ISAMs A-H 104(0)–(7) coupled to the DRAM array. Transfer lines 156 are used to couple an ISAM bit to the addressed row of the DRAM. Transfer transistors 186 are used to access the ISAM data bits and couple the data to the transfer lines. The transfer circuit 180 is used to control the gate voltage of transistors 186 to selectively activate the transfer transistors so that, for example, all of the ISAM A bits can be coupled to the transfer lines to transfer the data stored in the ISAM to the DRAM. As explained below, the transfer circuit can be used to couple the ISAMs to the DRAM in a predetermined pattern such that data can be transferred to the DRAM on all 512 transfer lines 156 at once using a plurality of the ISAMs.

It will be understood that the ISAMs can be any length and are not limited to 512 bits. Further, the number of ISAMs can be varied and are not intended to be limited to eight ISAMs as described above. While the buffer circuits 108 have been described for purposes of simplicity as serially receiving one bit of data on a clock cycle, it will be understood that the buffer can receive multiple parallel bits of data on each clock cycle without departing from the present invention.

Expandable Data Width for Increased Data Rate

As explained above, data is input to an ISAM using the input buffer/decode circuit 108, and a clock 112. In operation, data is received by the input buffer and one bit of data is loaded on a clock signal into the ISAM bit identified by the pointer of the decode. Each ISAM can, therefore, load one bit on each clock cycle. A nominal cycle time for an ISAM register is approximately 20 ns. If the ISAM is configured to receive one bit on each clock, then one bit of data can be serially transmitted every 20 ns. Accordingly, if the data width (number of bits per clock) of the ISAM is increased, the data rate of the ISAM is increased by the same factor. For example, an ISAM that is designed to handle 4 bits of parallel data at a time would have a data rate of 5 ns per bit (20 ns/4 bits). The time required to load and transfer an ISAM is dependent upon its cycle time and the length of the ISAM. Assuming for an ISAM, having a one bit data width, that the cycle time is 20 ns and it has 512 data bits, the time required to load the ISAM would be 10,240 ns (20 ns per bit).

Figure 13:
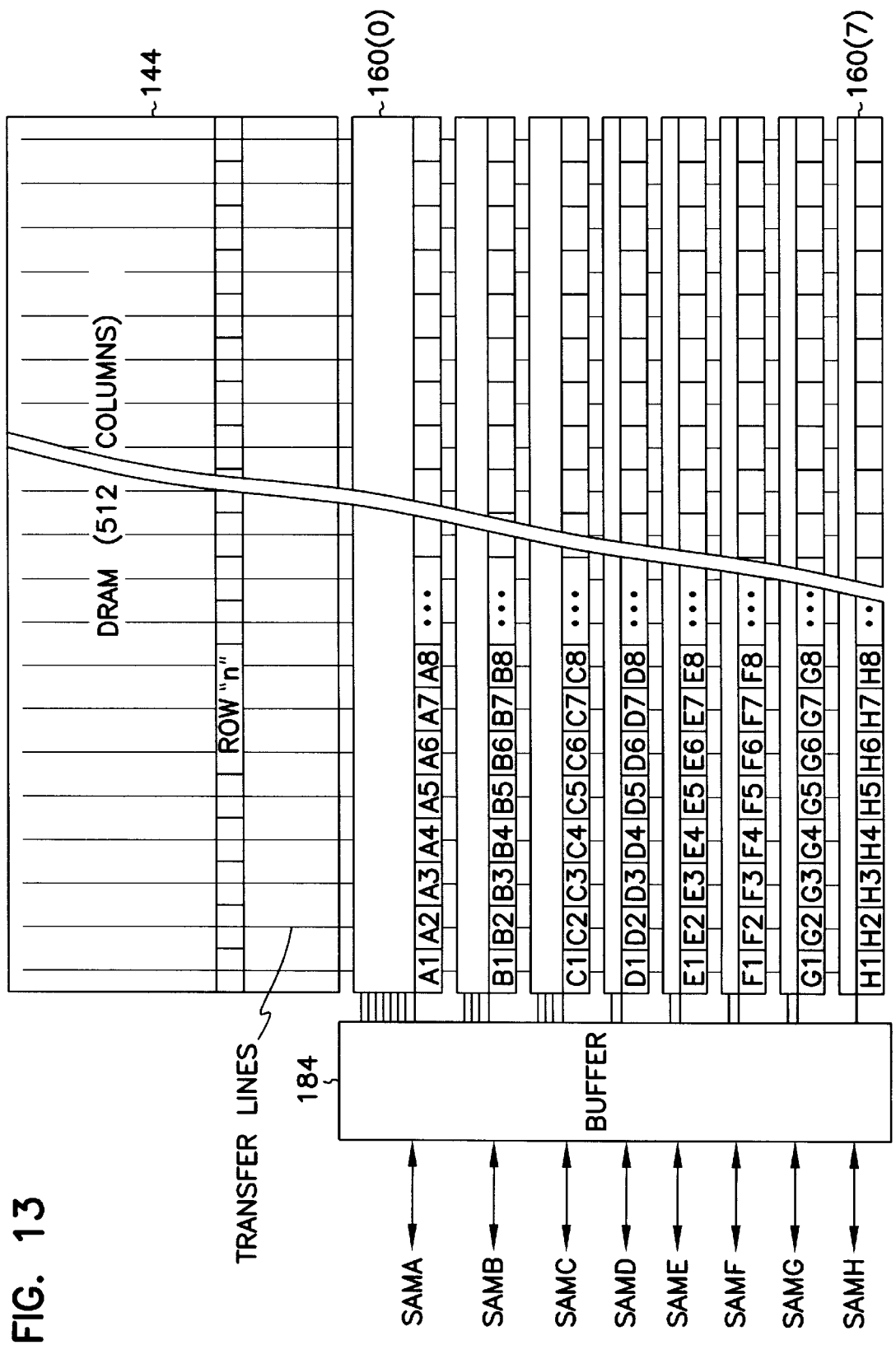
FIG. 13 is a simplified block diagram of an extended data width memory.

Several options are available to meet the need for increased input data rates while maintaining a full 512 bit transfer to the DRAM during one transfer cycle. The first option is a custom memory circuit having an expandable data width as shown in FIG. 13 where the eight data inputs 110 can be reconfigured and directed to different ISAMs. Because there are a fixed number of transfer lines between the ISAMs and the DRAM array, the ISAM must stay the same length when being reconfigured. To provide maximum data rates, one of the ISAMs needs to be laid out to handle the maximum number of data inputs (in this case 8). In order to implement all of the possible data rate configurations, one ISAM would be laid out to handle up to 8 data paths, two ISAMs would be laid out to handle up to 4 data paths each, four ISAMs would be laid out to handle up to 2 data paths each and the eighth ISAM would be laid out to handle just one data path. In operation, the memory circuit would operate in a selected mode where the input data provided on bus 110 is routed to the appropriate ISAM using an input buffer 184. This memory circuit, therefore, would allow a maximum data width of one byte of data to be loaded in an ISAM on one clock cycle.

It will be appreciated that the additional input data paths consume significantly more die area than one data path. Further, the capacitance of the data paths also increases and each ISAM is no longer characteristically the same, causing differences in operating power and speed for each ISAM. As such, this configuration is not preferred.

Figure 14:
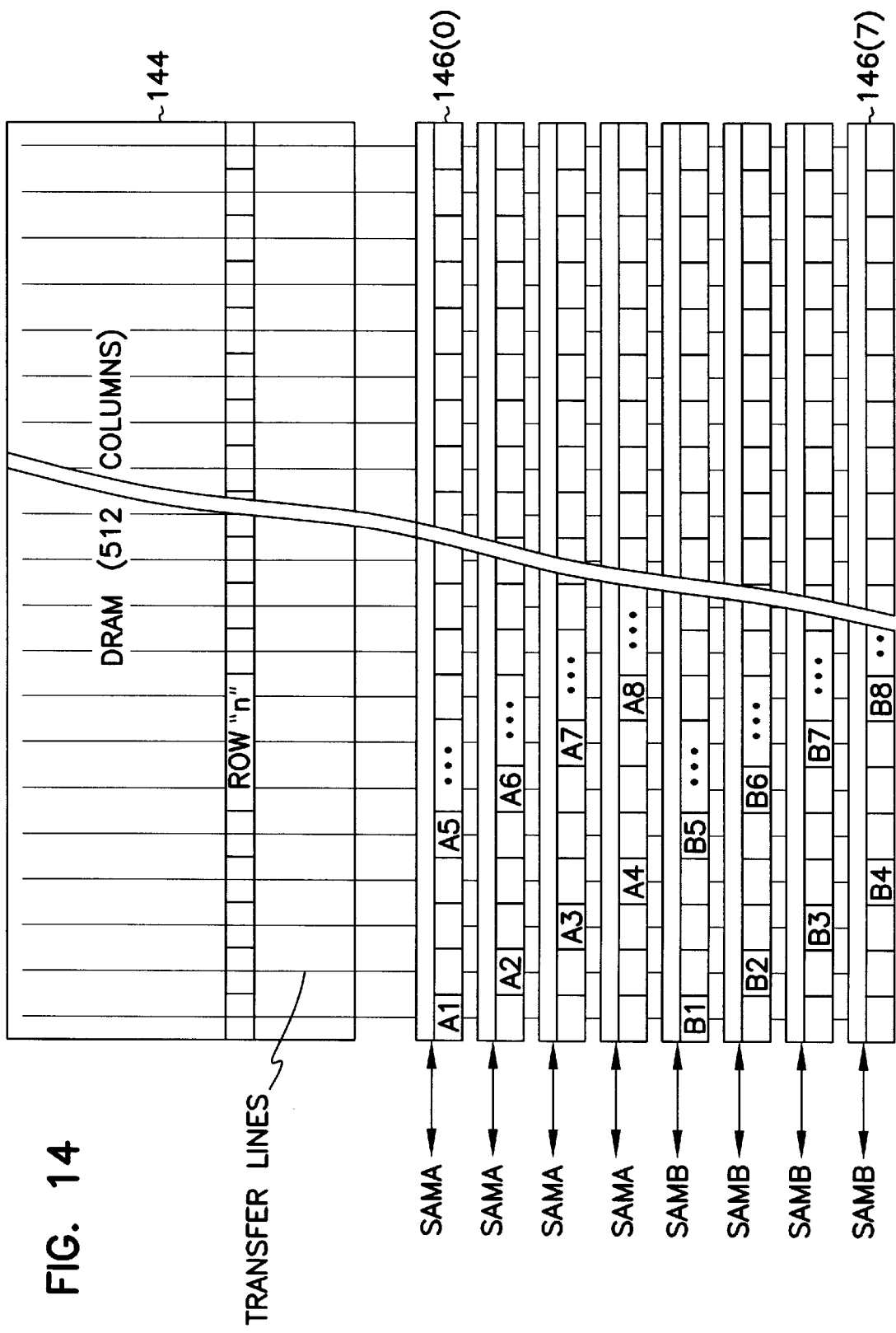
FIG. 14 is a simplified block diagram of an extended data width memory where four SAMs are used to store an ATM cell.

An alternate multiport memory increases the input data rate by changing the way each ISAM is addressed to effectively increase the data width of the ISAMs. The ISAMs can then be configured in combination to handle one, two, four or eight inputs during one clock cycle without the need to reroute the data provided on bus 110. This is accomplished by adjusting the clocks, counters and transfer circuit based upon a selected data rate operating mode. For example, referring to FIG. 14, assume four ISAMs are to be combined into one "ISAM A" that has four times the input data rate of a single ISAM. The individual clocks of each of the four ISAMs are synchronized so that each ISAM loads one data bit on each clock cycle. The first clock cycle is therefore used to load bits A1–A4 and bits A5–A8 are loaded on the next clock cycle. Alternatively, the four individual clock signals could be replaced with one master clock signal. The counters corresponding to each of the four ISAMs are also adjusted. The lower bits in each counter is set to a fixed number so that each counter increments by a pre-determined number of data bits on every clock. In the four ISAM example of FIG. 14, the lower two bits of the counter can be fixed so that the counter increments by four bits on each clock cycle. By choosing the fixed number carefully, each counter can be offset (staggered) from the other counters. To provide a multiport memory having a data rate of 5 ns (4 bits per 20 ns), the counter for ISAM 1 is not offset (lower 2 bits set to "00"), the counter for ISAM 2 is offset by one (lower 2 bits set to "01"), the counter for ISAM 3 is offset by two (lower 2 bits set to "10"), and the counter for ISAM 4 is offset by three (lower 2 bits set to "11"). As shown in FIG. 14, each ISAM starts at a different bit and increments four data bits on each clock cycle. Every fourth data bit in each ISAM, therefore, is used to make up the final "ISAM".

The transfer circuit 180 controls the transfer of data from the ISAMs based upon the operating mode selected. After 512 bits of data have been loaded into the ISAMs, the 128 occupied data bits of each of the four ISAMs must be transferred at one time to the DRAM (512 bit transfer). To make four ISAMs appear like one ISAM to the DRAM: data bits 1, 5, 9, 13 . . . from ISAM 104(0) are transferred; data bits 2, 6, 10, 14 . . . from ISAM 104(2) are transferred; data bits 3, 7, 11, 15 . . . from ISAM 104(3) are transferred; and data bits 4, 8, 12, 16 . . . from ISAM 104(4) are transferred. This can be accomplished with a decode function built into the transfer circuit 180. That is, the transfer transistors 186 illustrated in FIG. 12 can be controlled using the transfer circuit such that the transfer transistor for each of the occupied ISAM data bits is activated and the data stored therein is coupled to one of the 512 transfer lines 156. The above described memory circuit transfers 512 bits of data in one transfer cycle, but loaded the input data at four times the rate available using one ISAM. The input bus 110, therefore, does not need to be re-routed to accommodate increased data rates, but can remain coupled to one ISAM.

Figure 15:
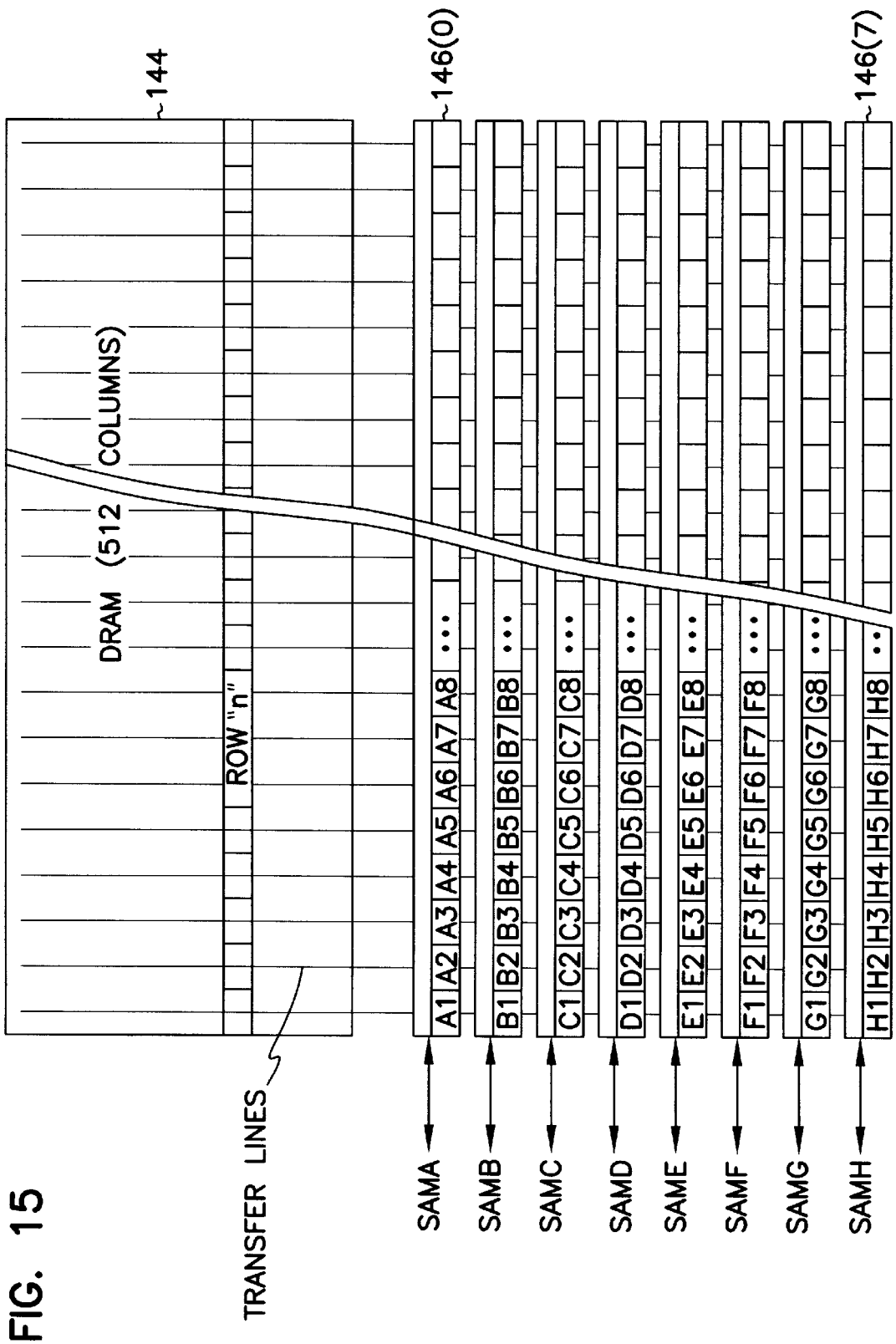
FIG. 15 is a simplified block diagram of an extended data width memory where one SAM is used to store an ATM cell.
Figure 16:
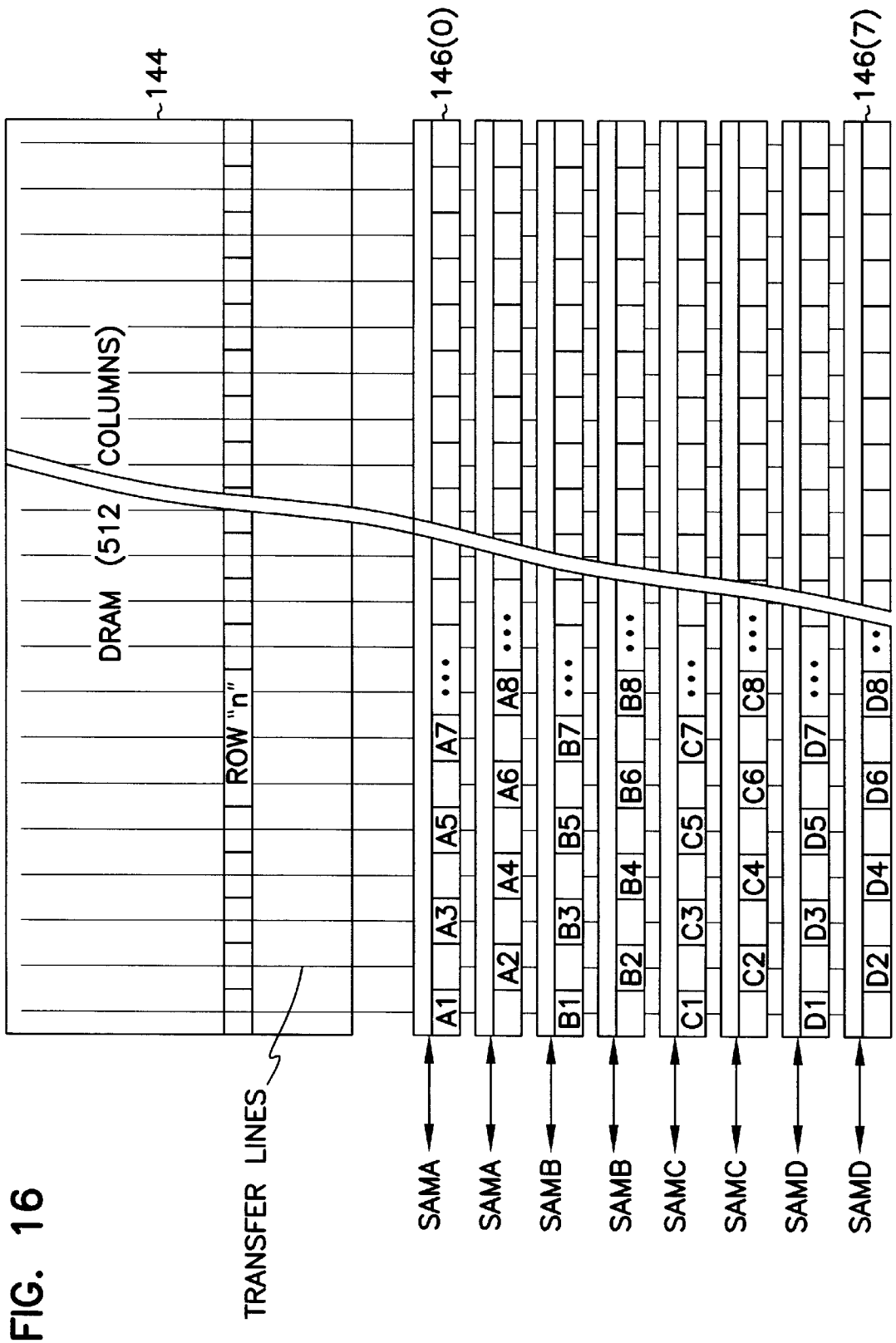
FIG. 16 is a simplified block diagram of an extended data width memory where two SAMs are used to store an ATM cell.
Figure 17:
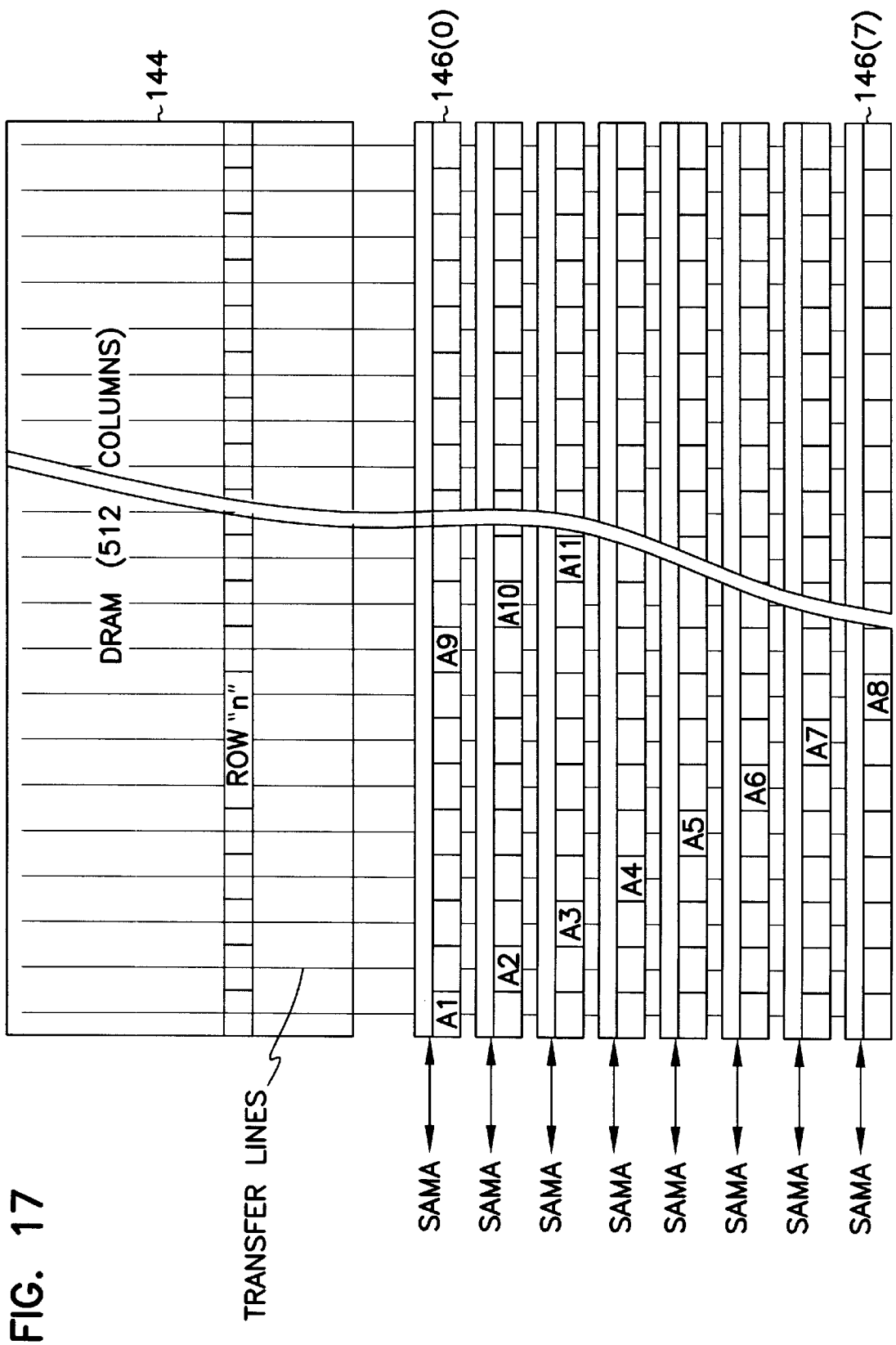
FIG. 17 is a simplified block diagram of an extended data width memory where eight SAMs are used to store an ATM cell.

The memory circuit is intended to be flexible such that it can be used in a variety of different data rate systems. That is, the ISAMs can be configured to operate independently such that one bit of an ATM cell is input on each clock cycle, see FIG. 15, used to double the data rate as shown in 16, or used in combination to allow an entire byte of an ATM cell to be loaded on each clock cycle, as seen in FIG. 17. While the mode of the memory circuit can be quickly changed using the control circuit 114 to operate at different data rates as required by different applications, it is anticipated that for a given application the memory circuit will operate in one mode.

Figure 18:
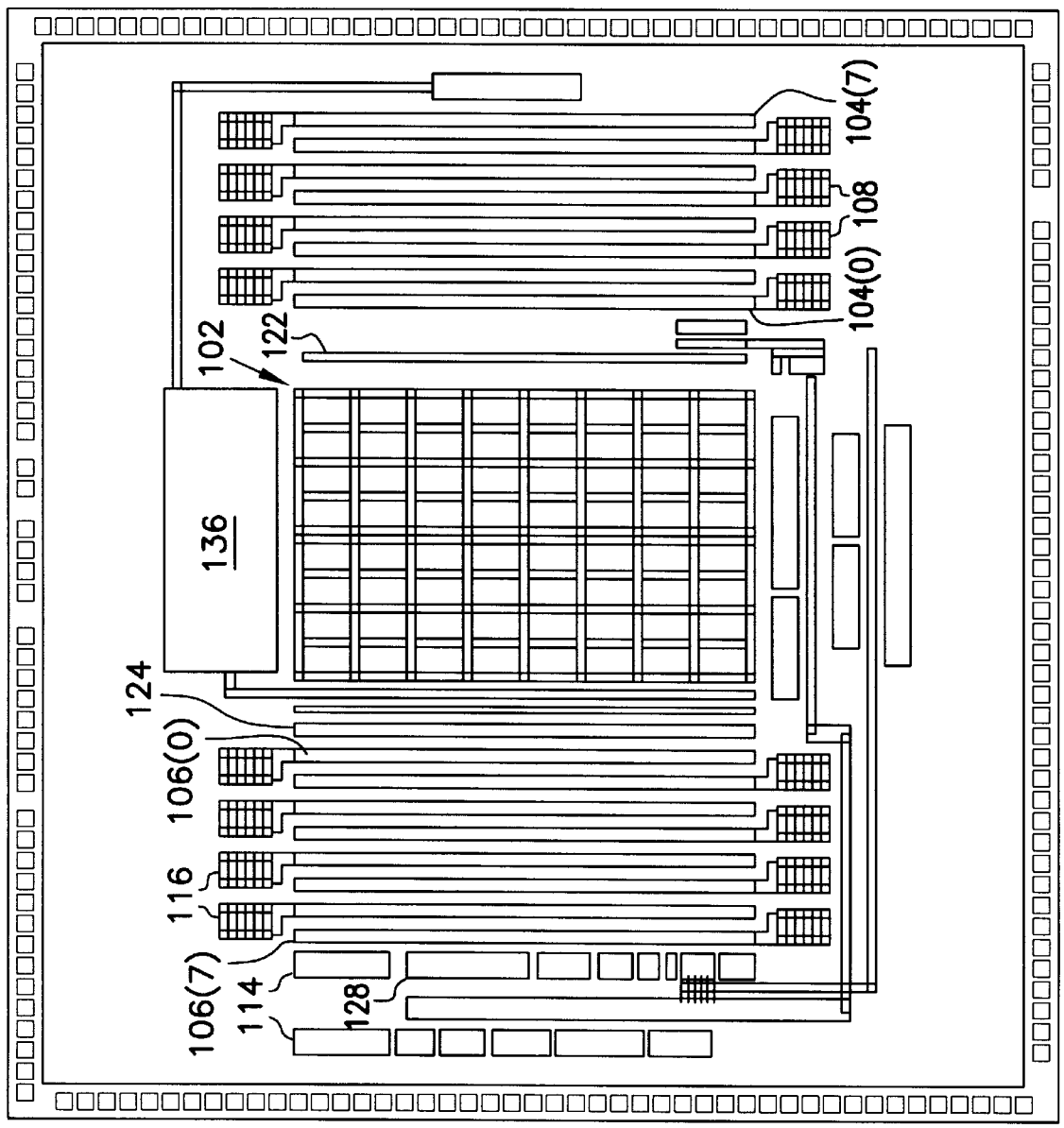
FIG. 18 is a diagram of an integrated circuit memory incorporating the present invention.

It will be understood that although ATM cells are currently a fixed length, the length of the ISAMs used in the present invention is not limited to 512 bits as described herein. Further, additional ISAMs can be included in the present memory circuit to further increase the operating data rates. Although input SAMs have been used to describe the present invention, it will be understood that output SAMs (OSAM) can be used to increase the data width and speed the transfer of data from the RAM to the OSAM. FIGS. 13–17 illustrate SAMs which can be used as both input and output SAMs. FIG. 18 illustrates a plan view of a memory incorporating the present invention.

Conclusion

A multiport memory has been described which has a DRAM array, input SAMs, and output SAMs. The SAMs each have one or more dedicated input/output data lines for receiving/transmitting external data communications. This data can be any type of data communications, but the memory is particularly well suited for ATM data cells. Circuitry is included in the memory to allow the memory to be operated in a number of different data width modes. The OSAMs or ISAMs are used in combination, depending upon the data width mode selected, to store output or input data. Each SAM stores a fraction of the full data communication, or ATM cell.

A flexible memory is described having an internal transfer circuit which allows portions of an ATM cell to be edited before and after storage on an internal DRAM. The memory provides a parity generator and parity check comparator circuit to monitor errors which may be induced during internal transfers. The internal transfer circuit comprises helper flip/flops (HFF) such that ATM data can be transferred from an internal ISAM to a HFF, edited, and transferred directly to another HFF prior to storing in the DRAM. The transfer circuit further provides an output edit register comprising of OR-type gates to edit the ATM data during an output transfer from the DRAM to an OSAM.

The portions of each ISAM which contain the ATM cell are then selectively transferred to the DRAM array. The memory, therefore, allows the ISAMs to be configured as "one" ISAM having an expandable data width. The data rate of the memory is adjustable by selecting the data rate mode, while maintaining a full ATM cell transfer from the ISAMs to the DRAM on one transfer cycle.

The DRAM can transfer a full ATM cell to the OSAMs such that each OSAM stores a portion of the ATM cell. The OSAMs are, therefore, configured as "one" OSAM having an expandable data width.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, although the memory described has eight ISAMs, any number of ISAMs could be used. In addition, DRAM 102 can be replaced with other memories, such as a static RAM. Further, the staggered pattern of configuring the ISAMs is merely one way of configuring the ISAMs. Those skilled in the art can recognize that any pattern can be used to configure the ISAMs so that an input data communication is stored in a plurality of ISAMs. Therefore, it is manifestly intended that this invention be limited only by the claims and the equivalents thereof.

What is claimed is:

1. A data switch comprising;
    a plurality of double-buffered input serial access memories each for receiving an input data package;
    a dynamic random access memory array;
    a plurality of double-buffered output serial access memories each for storing an output data package;
    data transfer buses for transferring input data packages from the plurality of double-buffered input serial access memories to the dynamic random access memory array, the data transfer buses further transferring the input data packages from the dynamic random access memory array to the plurality of double-buffered output serial access memories;
    an input edit buffer for editing the input data package prior to transferring to the dynamic random access memory; and
    an output edit buffer for editing the input data package prior to transferring to the plurality of double-buffered output serial access memories.

2. The data switch of claim 1 comprising eight double-buffered input serial access memories.

3. The data switch of claim 1 wherein each one of the plurality of double-buffered input serial access memories are 512 bits wide.

4. The data switch of claim 1 comprising eight double-buffered output serial access memories.

5. The data switch of claim 1 wherein each one of the plurality of double-buffered output serial access memories are 512 bits wide.

6. The data switch of claim 1 wherein the dynamic random access memory array is a four mega-bit dynamic random access memory array.

7. The data switch of claim 1 further comprising cyclic redundancy check circuitry coupled to the input and output edit buffers.

8. The data switch of claim 1 wherein the plurality of double-buffered input serial access memories are adapted to be formatting such that the plurality of double-buffered input serial access memories in combination receive one input data package, each one of the plurality of double-buffered input serial access memories receiving a portion of the input data package.

9. An asynchronous transfer mode (ATM) switch comprising:
   a dynamic random access memory array;
   eight double buffered input serial access memories each for receiving an ATM data package;
   eight double-buffered output serial access memories each for storing an ATM data package;
   an edit buffer for modifying an ATM data package; and
   control circuitry.

10. The asynchronous transfer mode (ATM) switch of claim 9, further comprising:
    error correction circuitry for detecting and correcting errors in an ATM data package.

11. A data transfer system comprising:
    a data switch comprising:
        a plurality of double-buffered input serial access memories each for receiving an input data package from a first external data bus;
        a dynamic random access memory array;
        a plurality of double-buffered output serial access memories each for outputting an output data package on a second external data bus;
        data transfer buses for transferring input data packages from the plurality of double-buffered input serial access memories to the dynamic random access memory array, the data transfer buses further transferring the input data packages from the dynamic random access memory array to the plurality of double-buffered output serial access memories;
        an input edit buffer for editing the input data package prior to transferring to the dynamic random access memory; and
        an output edit buffer for editing the input data package prior to transferring to the plurality of double-buffered output serial access memories; and
    a micro-processor connected to the data switch for controlling data transfer from the first external data bus to the second external data bus.

* * * * *